United States Patent [19]

Drotloff et al.

[11] Patent Number: 5,342,664
[45] Date of Patent: Aug. 30, 1994

[54] ALLOYS MADE FROM PARTLY CRYSTALLINE AND AMORPHOUS POLY (ARYL ETHER KETONE) COMPOUNDS

[75] Inventors: Hans-Otto Drotloff, Frankfurt am Main; Otto Herrmann-Schönherr, Bensheim, both of Fed. Rep. of Germany

[73] Assignee: Hoechst Aktiengesellschaft, Frankfurt am Main, Fed. Rep. of Germany

[21] Appl. No.: 50,056

[22] PCT Filed: Dec. 2, 1991

[86] PCT No.: PCT/EP91/02280
§ 371 Date: Apr. 30, 1993
§ 102(e) Date: Apr. 30, 1993

[87] PCT Pub. No.: WO92/10542
PCT Pub. Date: Jun. 25, 1992

[30] Foreign Application Priority Data
Dec. 14, 1990 [DE] Fed. Rep. of Germany ....... 4039924

[51] Int. Cl.$^5$ .............................................. C08L 71/10
[52] U.S. Cl. ..................................... 428/36.9; 525/471
[58] Field of Search ......................... 525/471; 428/36.9

[56] References Cited

U.S. PATENT DOCUMENTS 4,609,714 9/1986 Harris .................................... 525/471
4,985,293 1/1991 Keep ..................................... 428/209

FOREIGN PATENT DOCUMENTS 0113112 7/1984 European Pat. Off. .
0437845 7/1991 European Pat. Off. .

*Primary Examiner*—David Buttner
*Attorney, Agent, or Firm*—Curtis, Morris & Safford

[57] ABSTRACT

Polymer alloys which comprise a) 60 to 98 percent by weight of at least one partly crystalline poly(aryl ether ketone) having a limiting viscosity number of 0.2 to 0.5 dl/g and b) 40 to 2 percent by weight of at least one amorphous poly(aryl ether ketone) having a limiting viscosity number of 0.2 to 3.0 dl/g, the weights being based in each case on the total amount of components (a) plus (b) in the alloy, and which can be used for the production of shaped articles or as a matrix material for composites.

18 Claims, No Drawings

ALLOYS MADE FROM PARTLY CRYSTALLINE AND AMORPHOUS POLY (ARYL ETHER KETONE) COMPOUNDS

DESCRIPTION

The invention relates to alloys of partly crystalline and amorphous poly(ether ketones) and to their use for the production of shaped articles or as a matrix material for composite materials.

In recent years, a large number of publications have appeared which describe the synthesis and properties of poly(aryl ethers). One of the earliest works is concerned with electrophilic substitution of aromatic dihalides using unsubstituted aromatic compounds, such as diphenyl ethers (U.S. Pat. No. 3,065,205). Johnson et al. (Journal of Polymer Science, A-1, 5, 1967, 2415-2427; U.S. Pat. Nos. 4,107,837 and 4,175,175) describe nucleophilic aromatic substitutions (condensations). This synthesis route has led to a novel class of poly(aryl ethers), the poly(aryl ether ketones).

The interest in poly(aryl ether ketones) has increased recently, as the appearance of a number of publications shows: U.S. Pat. Nos. 3,953,400; 3,956,240; 4,247,682; 4,320,224; 4,339,568; Polymer, 22 (1981), 1096-1103; Polymer 24 (1983), 953-958.

Some poly(aryl ether ketones) are highly crystalline and exhibit melting temperatures far in excess of 300° C., while others are amorphous. Amorphous and partly crystalline poly(aryl ether ketones) can be synthesized with various molecular weights. Poly(aryl ether ketones) are a valuable class of polymers having a high level of properties. They are distinguished, inter alia, by a high thermal resistance and hydrolytic stability. Moreover, the partly crystalline poly(aryl ether ketones) have a good resistance to solvents.

Several partly crystalline poly(aryl ether ketones) are already commercially available, for example those having the following structure:

Poly(ether ketone) (PEK)

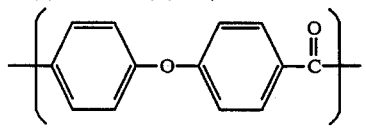

Poly(ether ether ketone) (PEEK)

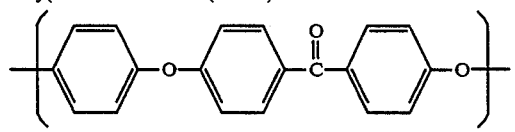

For some uses, for example as matrix materials for composites, the elongations at break and melt viscosities achieved to date for the partly crystalline poly(aryl ether ketones) are still in need of improvement.

It is now known that technologically important properties of polymers, such as those mentioned above, can be adjusted by alloying the polymers with other polymers. However, the ability to predict with certainty the properties of an alloy from the properties of the individual components is as yet a long way away. The alloying of polymers therefore remains largely empirical. The object of the present invention is therefore to provide alloys based on partly crystalline poly(aryl ether ketones) having an increased elongation at break and improved processibility in the melt, in particular for the preparation of composite materials.

It has now been found that alloys of partly crystalline poly(aryl ether ketones) and amorphous poly(aryl ether ketones) have both higher elongations at break and lower melt viscosities than the partly crystalline poly(aryl ether ketones) by themselves. Nevertheless, the alloys (in contrast to the amorphous poly(aryl ether ketones)) are resistant to solvents and have high moduli. The invention thus relates to polymer alloys comprising (a) 60 to 98 percent by weight of at least one partly crystalline poly(aryl ether ketone) having a intrinsic viscosity of 0.2 to 5.0 dl/g and (b) 40 to 2 percent by weight of at least one amorphous poly(aryl ether ketone) having a intrinsic viscosity of 0.2 to 3.0 dl/g, the weights being based in each case on the total amount of components (a) plus (b) in the alloy.

The partly crystalline poly(aryl ether ketones) are preferably employed in amounts of 80 to 95 percent by weight, and in particular 90 to 95 percent by weight. The content of amorphous poly(aryl ether ketones) is preferably 20 to 5 percent by weight, in particular 10 to 5 percent by weight.

The alloys of the present invention comprise, as partly crystalline components, poly(aryl ether ketones) having one or more recurring units of the following formulae:

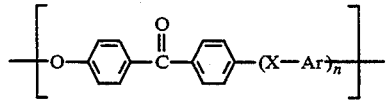

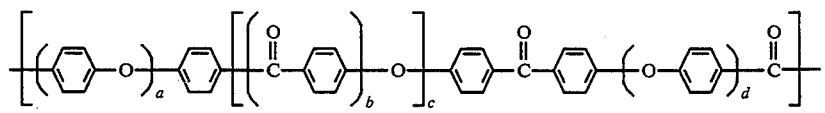

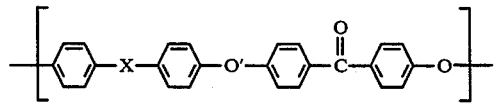

-continued

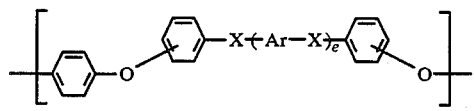

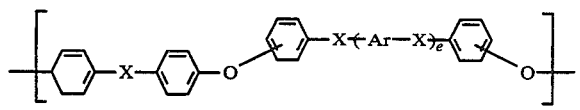

in which Ar, independently of one another, is a divalent aromatic radical chosen from phenylene, biphenylene or naphthylene, X, independently of one another, is O, CO or a direct bond, n is an integer from zero to 3, b, c, d and e are zero or 1 and a is an integer from 1 to 4.

Preferably, d is zero if b is 1. However, at least one of the recurring units contained in the component must have at least 1 CO group. Preferred partly crystalline poly(aryl ether ketones) comprise at least one recurring unit from the following formulae:

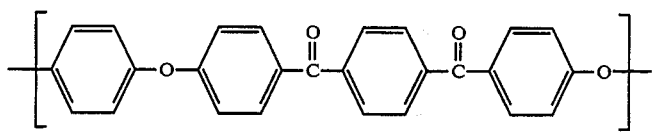

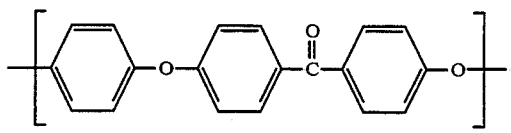

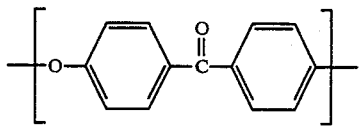

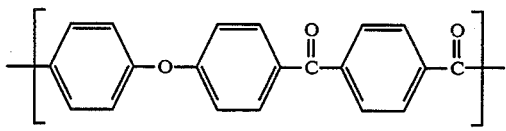

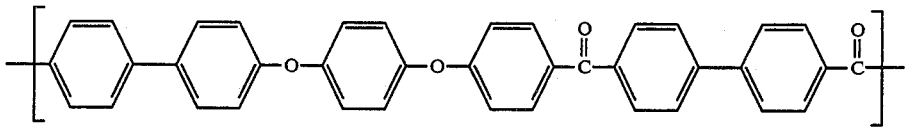

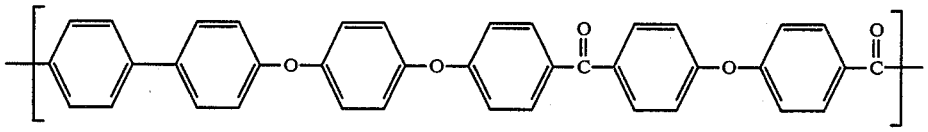

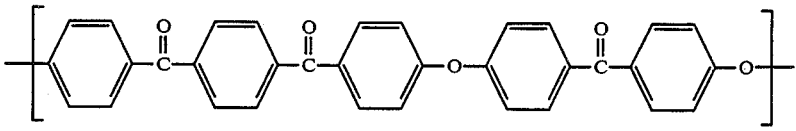

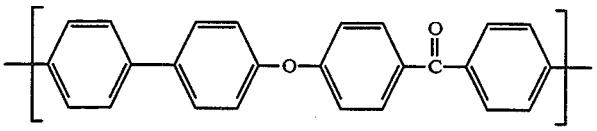

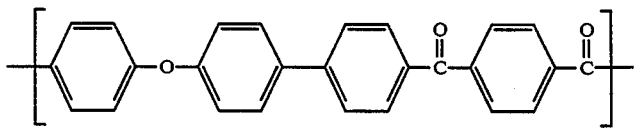

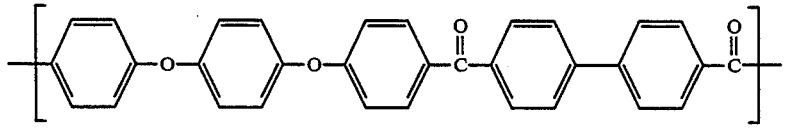

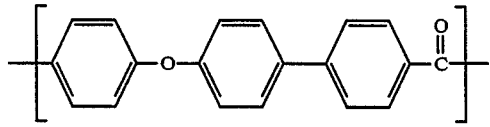

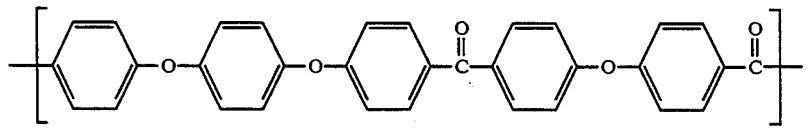

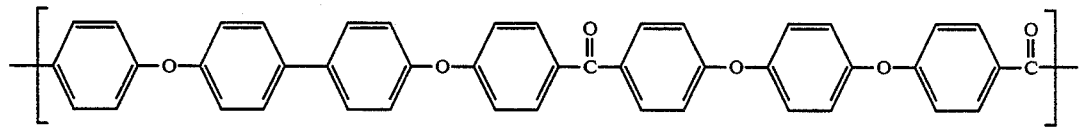

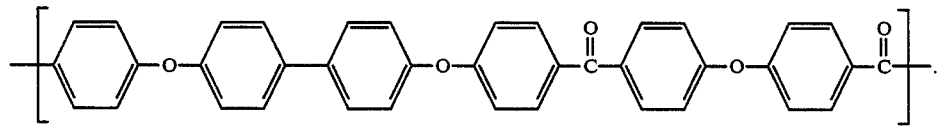

These partly crystalline poly(aryl ether ketones) can be synthesized by known methods, which are described in CA-A-847,963; U.S. Pat. Nos. 4,176,222; 3,953,400; 3,441,538; 3,442,857; 3,516,966; 4,396,755 and 4,398,020.

The term partly crystalline poly(aryl ether ketones) as used here includes homopolymers and copolymers, such as, for example, terpolymers and block copolymers.

The intrinsic viscosity of the amorphous poly(aryl ether ketones) is in general determined in N-methylpyrrolidone. Chloroform or N,N-dimethylacetamide as solvents lead to comparable values. If the polisher does not dissolve in these solvents, 96% strength sulfuric acid is used. The determination is carried out at 25° C.

The partly crystalline poly(aryl ether ketones) preferably have intrinsic viscosity of 0.5 to 2.5 dl/g, and in particular 0.7 to 2.0 dl/g, measured in 96% strength sulfuric acid at 25° C.

Amorphous poly(aryl ether ketones) which can be employed in the alloys according to the invention have no melting point but only a glass transition temperature and are built up from recurring units of the formula I

—[O—A—O—B]—     (I)

in which A is chosen from the radicals

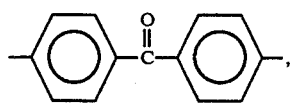 A1

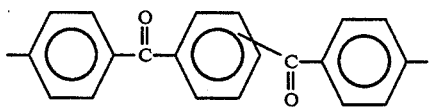 A2 (meta- or para-substitution) or

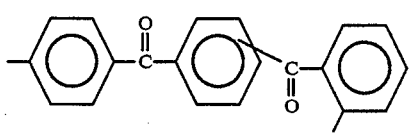 A3 (meta- or para-substitution)

and B is chosen from the radicals

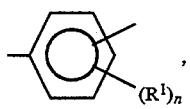 B1

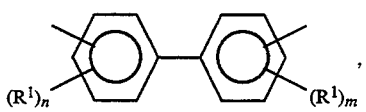 B2

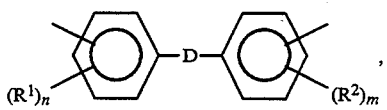 B3

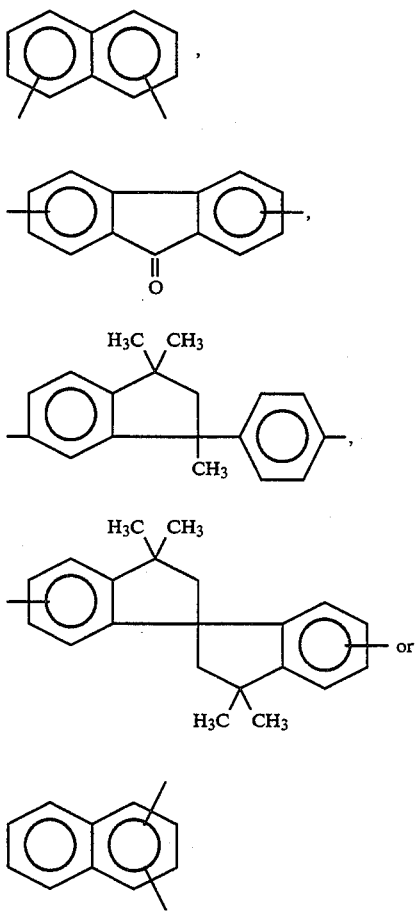

where $R^1$ and $R^2$ are identical or different and are halogen (F, Cl, Br or I, preferably bromine), $C_1$-$C_8$-alkyl or $C_1$-$C_8$-alkoxy, preferably $C_1$-$C_4$-alkyl, such as methyl, ethyl or the various isomers of propyl or butyl, or $C_1$-$C_4$-alkoxy, such as methoxy, ethoxy or the various propoxy or butoxy radicals, and m and n are identical or different and are zero or an integer from 1 to 4, preferably zero, 1 or 2, in particular zero or 2. If $R^1$ and $R^2$ in the radicals B2 and B3 are halogen, m and n are preferably 2. D is chosen from the divalent radicals

—O—   D1

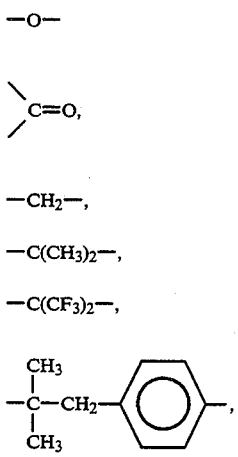

—CH$_2$—,   D3

—C(CH$_3$)$_2$—,   D4

—C(CF$_3$)$_2$—,   D5

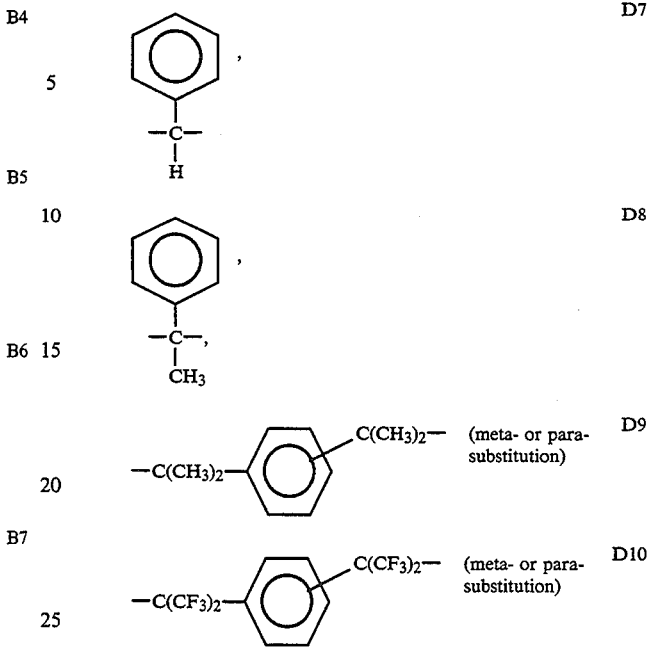

The molar ratio of units A to B is 0.95:1 to 1.05:1.0, preferably 1:1.

These amorphous poly(ether ketones) can be synthesized by known methods. Some are described in High Performance Polymers, Volume I(1), 41 et seq. (1989) and in Polymer 29, 358 et seq. (1988).

The amorphous poly(aryl ether ketones) listed can be homopolymers, i.e. which comprise only one unit of the type A and one unit of the type B per recurring unit, or copolycondensates which comprise two or more than two different units of the type A and/or two or more than two different units of the type B.

A is preferably chosen from A1 and A2, and is particularly preferably A2. B is preferably chosen from B1, B2 and B3; B3 is particularly preferred. D (in B3) is preferably D2, D3, D4, D5, D6, D7, D8, D9 or D10, which are preferably linked in the para-position. D4, D5, D9 and D10 are particularly preferred.

If A has been chosen from A1 and A2, B is preferably not B4. If B is B3 and n is zero, D is preferably D3 to D10.

If A in the structural unit (I) is A3, B is preferably B1 or B2, where n is zero, 1 or 2, in particular zero.

The amorphous poly(aryl ether ketones) preferably have intrinsic viscosity of 0.3 to 1.0 dl/g, and in particular 0.3 to 0.6 dl/g.

The alloys according to the invention are prepared by known alloying methods. For example, the alloying partners are extruded to strands together in the form of powders or granules in an extruder, the strands are chopped to granules and these are brought into the desired shape, for example by pressing or injection molding.

The alloys according to the invention can comprise additives, for example plasticizers, heat stabilizers, UV stabilizers, impact modifiers or reinforcing additives, such as glass fibers, carbon fibers or high modulus fibers, for example polyaramide fibers.

The alloys according to the invention can be employed particularly advantageously as matrix materials for composite materials, since they have both an increased elongation at break and good flow properties. In particular, composites of the alloys according to the invention with glass fibers or carbon fibers are mechanically stable and can be prepared without gas bubbles. The alloys furthermore are suitable for the production of shaped articles by the injection molding or extrusion process, for example in the form of fibers, films and tubes.

The invention is illustrated in more detail by the following examples.

The partly crystalline poly(aryl ether ketone) I having a intrinsic viscosity of 1.2 dl/g, measured in 96% strength sulfuric acid at 25° C., and a melting point of 334° C. comprises recurring units of the following formula:

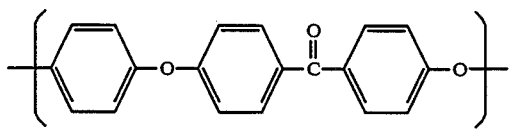

The partly crystalline poly(aryl ether ketone) II having a intrinsic viscosity of 1.0 dl/g, measured in 96% strength sulfuric acid at 25° C., and a melting point of 365° C. comprises recurring units of the following formula:

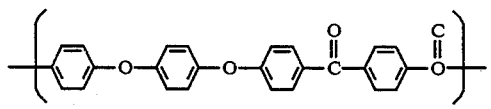

The amorphous poly(aryl ether ketone) III having a intrinsic viscosity of 0.45 dl/g, measured in chloroform at 25° C., and a glass transition temperature of 160° C. comprises recurring units of the following formula:

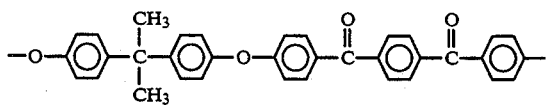

The amorphous poly(aryl ether ketone) IV having a intrinsic viscosity of 0.46 dl/g, measured at 25° C. in N-methylpyrrolidone, and a glass transition temperature of 160° C. comprises recurring units of the following formula:

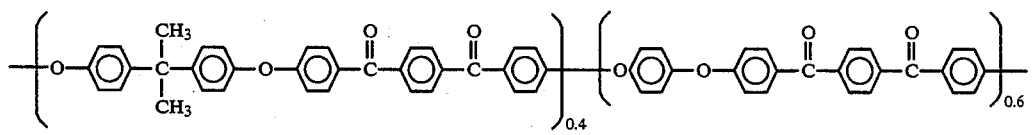

The abovementioned polymers were first dried (140° C., 24 hours, reduced pressure) and then extruded in various weight ratios under a protective gas in a measurement extruder (HAAKE, Rheocord System 90/Rheomex TW 100 Karlsruhe, Federal Republic of Germany). Argon was preferably employed as the inert or protective gas. The resulting alloys were dried (140° C., 24 hours, reduced pressure) and then either injection molded to moldings such as dumbbell-shaped bars (Stübbe S55d injection molding machine from DEMAG Kalldorf, Federal Republic of Germany) or investigated for their physical properties. The following equipment was used for this: melt flow index tester MPS - D from Goettfert, Buchen, Federal Republic of Germany for measurement of the flow properties of the alloys. Tensile stress-elongation machine from Instron, Offenbach, Federal Republic of Germany for determination of mechanical properties. Differential calorimeter DSC 7 from Perkin Elmer, Überlingen, Federal Republic of Germany for determination of the glass transition temperatures of the alloys.

EXAMPLE 1

Poly(aryl ether ketone) I and poly(aryl ether ketone) III were extruded together in various weight ratios by means of a twin-screw extruder (all four zones 380° C.) and the extrudate was granulated. The granules were then dried under reduced pressure at 140° C. for 24 hours and used for measurements of the flow properties of the alloys. The resulting MFI values (melt flow index in accordance with DIN 53735 - MFI-B, 360° C.) are shown in Table 1.

TABLE 1

| Flow properties | | |
|---|---|---|
| Poly(aryl ether ketone) I | Poly(aryl ether ketone) III | MFI (360° C.) |
| 100% | 0% | 9 |
| 90% | 10% | 14 |
| 80% | 20% | 18 |
| 70% | 30% | 23 |

The results show that the alloys according to the invention have a lower melt viscosity than pure partly crystalline poly(aryl ether ketone) I.

EXAMPLE 2

Poly(aryl ether ketone) II and poly(aryl ether ketone) III were extruded together in various weight ratios by means of a twin-screw extruder (all four zones 380° C.) and the extrudate was granulated. The granules were then dried under reduced pressure at 140° C. for 24 hours and used for measurements of the flow properties of the alloys. The resulting MFI values (melt flow index in accordance with DIN 53735 - MFI-B, 400° C.) are shown in Table 2.

TABLE 2

| Flow properties | | |
|---|---|---|
| Poly(aryl ether ketone) II | Poly(aryl ether ketone) III | MFI (400° C.) |
| 100% | 0% | 40 |
| 90% | 10% | 48 |
| 80% | 20% | 55 |

The results show that the alloys according to the invention have a lower melt viscosity than the pure partly crystalline poly(aryl ether ketone) II.

EXAMPLE 3

Granules prepared according to Example 1 were injection molded to dumbbell-shaped bars at 380° C.

Tensile stress-elongation experiments were carried out on these tensile bars. Table 3 summarizes the results.

TABLE 3

| Mechanical properties | | | | |
|---|---|---|---|---|
| Poly(aryl ether ketone) I | Poly(aryl ether ketone) III | Initial modulus (GPa) | Elongation at break % | Yield stress (MPa) |
| 100% | 0% | 3.1 | 17 | 68 |
| 90% | 10% | 3.0 | 22 | 68 |

The results show that the alloy according to the invention has a higher elongation at break compared with the pure partly crystalline poly(aryl ether ketone) I. The other mechanical properties are at a comparable level.

EXAMPLE 4

Granules prepared according to Example 2 were injection molded to dumbbell-shaped bars at 380° C. Tensile stress/elongation experiments were carried out on these tensile bars, the results of the experiments being summarized in Table 4.

TABLE 4

| Mechanical properties | | | | |
|---|---|---|---|---|
| Poly(aryl ether ketone) II | Poly(aryl ether ketone) III | Initial modulus (GPa) | Elongation at break % | Yield stress (MPa) |
| 100% | 0% | 3.4 | 10 | 76 |
| 90% | 10% | 3.3 | 15 | 75 |

The results show that the alloy according to the invention has a higher elongation at break, without impairment of the other mechanical properties, compared with the pure partly crystalline poly(aryl ether ketone) II.

EXAMPLE 5

Amorphous poly(aryl ether ketone) IV (10%) was mixed with partly crystalline poly(aryl ether ketone) II (90%) as described in Example 1 and the mixture was injection molded to dumbbell-shaped bars at 380° C. The elongation at break, determined by a tensile stress-elongation experiment, was 14%.

EXAMPLE 6

Dumbbell-shaped bars were produced from 90% of poly(aryl ether ketone) II and 10% of poly(aryl ether ketone) III as described in Example 4 and were then stored in N-methylpyrrolidone, a solvent for the amorphous poly(aryl ether ketone) III, at 30° C. for 30 days. The dimensions and the weight of these test specimens were unchanged after the storage time. The mechanical properties of the stored specimens were not impaired. The measurement data showed no difference compared with the values given in Example 4.

EXAMPLE 7

Poly(aryl ether ketone) II and the amorphous poly(aryl ether ketone) V

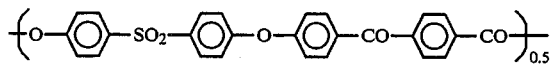

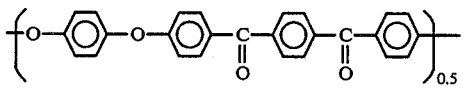

are injection molded in a weight ratio of 80 to 20 by a procedure analogous to that described in Example 4. The initial modulus of the resulting alloy was 3.3 GPa, the elongation at break was 20% and the yield stress was 79 MPa.

The ketone V used has a intrinsic viscosity of 0.5 (measured at 25° C. in 96% strength $H_2SO_4$).

We claim:
1. Polymer alloy comprising
   a) 60 to 98% by weight of at least one partly crystalline poly(aryl ether ketone) having a intrinsic viscosity of 0.2 to 5.0 dl/g and
   b) 40 to 2% by weight of at least one other poly(aryl ether ketone) which is amorphous, has no melting point and only a glass transition temperature, and has a intrinsic viscosity of 0.2 to 3.0 dl/g, the weights being based in each case on the total amounts of components (a) plus (b) in the alloy, the intrinsic viscosity of the partly crystalline poly(aryl ether ketone) being measured in 96% strength sulfuric acid at 25° C. and the intrinsic viscosity of the amorphous poly(aryl ether ketone) being measured in N-methylpyrrolidone at 25° C. if the poly(aryl ether ketone) is soluble in N-methylpyrrolidone or in 96% strength sulfuric acid at 25° C. if the poly(aryl ether ketone) is not soluble in N-methylpyrrolidone.

2. An alloy as claimed in claim 1, which comprises 80 to 95 percent by weight of the partly crystalline poly(aryl ether ketones) and 20 to 5 percent by weight of the amorphous poly(aryl ether ketones).

3. An alloy as claimed in claim 2, which comprises 90 to 95 percent by weight of the partly crystalline poly(aryl ether ketones) and 10 to 5 percent by weight of the amorphous poly(aryl ether ketones).

4. An alloy as claimed in claim 1, in which the partly crystalline poly(aryl ether ketones) have intrinsic viscosity of 0.5 to 2.5 dl/g end the amorphous poly(aryl ether ketones) have intrinsic viscosity of 0.3 to 1.0 dl/g.

5. An alloy as claimed in claim 3, in which the partly crystalline poly(aryl ether ketones) have a intrinsic viscosity of 0.7 to 2.0 dl/g and the amorphous poly(aryl ether ketones) have intrinsic viscosity of 0.3 to 0.8 dl/g.

6. An alloy as claimed in claim 1, in which the partly crystalline poly(aryl ether ketone) comprises recurring units of one or more of the following formulae:

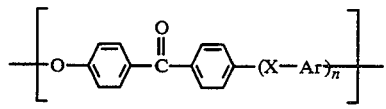

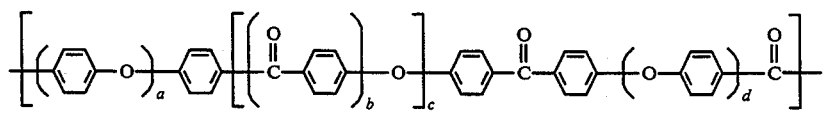

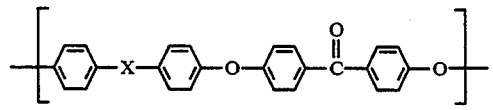

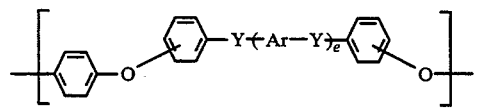

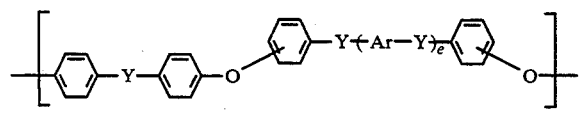

in which Ar, independently of one another, is a divalent aromatic radical chosen from phenylene, biphenylene or naphthylene, X and Y, each independently of one another, is O, CO or a direct bond, at least one Y is a carbonyl group, n is zero, 1, 2 or 3, b, c, d and e are zero or 1 and a is 1, 2, 3 or 4.

7. An alloy as claimed in claim 6, in which the partly crystalline poly(aryl ether ketone) is composed of recurring units of one of the following structures:

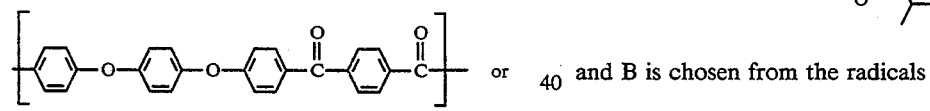 or

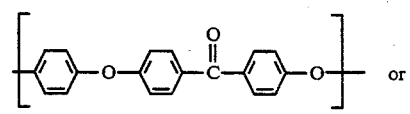 or

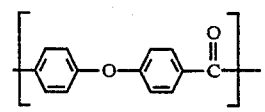

8. An alloy as claimed in claim 6, in which d is zero and b is 1.

9. An alloy as claimed in claim 1, in which the amorphous poly(aryl ether ketone) comprises recurring units of the formula I

—[O—A—O—B]—   (I)

in which the molar ratio of units A and B is 0.95:1 to 1.05:1, A is chosen from the radicals

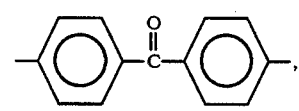   A1

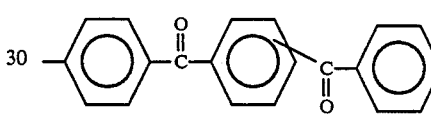   A2 (meta- or para-substitution) or

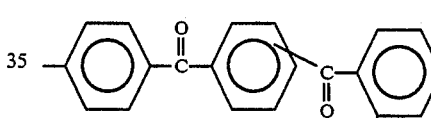   A3 (meta- or para-substitution)

and B is chosen from the radicals

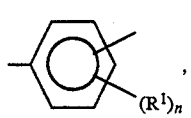   B1

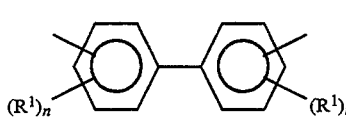   B2

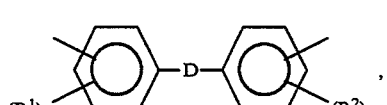   B3

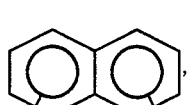   B4

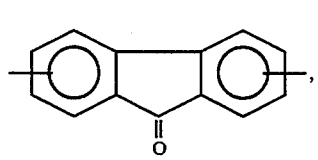   B5

-continued

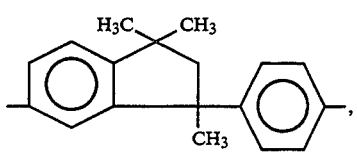

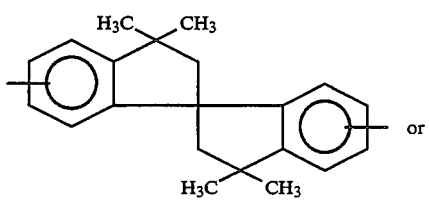

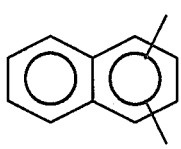

in which R$^1$ and R$^2$ independently of one another are halogen, C$_1$–C$_8$-alkyl or C$_1$–C$_8$-alkoxy, m and n independently of one another are zero or an integer from 1 to 4 and D is chosen from the divalent radicals

—O—  D1

  D2

—CH$_2$—,  D3

—C(CH$_3$)$_2$—,  D4

—C(CF$_3$)$_2$—,  D5

  D6

-continued

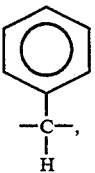  D7

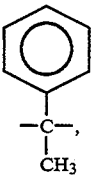  D8

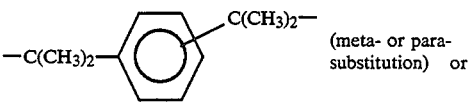  D9

(meta- or para-substitution) or

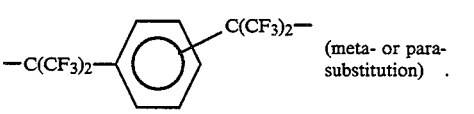  D10

(meta- or para-substitution).

10. An alloy as claimed in claim 9, in which R$^1$ and R$^2$ are bromine, C$_1$–C$_4$-alkyl or C$_1$–C$_4$-alkoxy and m and n are zero, 1 or 2, and the molar ratio of units A to B is 1:1.

11. An alloy as claimed in claim 9, in which the structural unit A is A1 or A2, the structural unit B is B1, B2 or B3 and, in the case of B3, the structural unit D comprises one of the radicals D2 to D10.

12. An alloy as claimed in claim 11, in which the structural unit A is A2, the structural unit B is B3 and the structural unit D is D4, D5, D9 or D10.

13. An alloy as claimed in claim 9, in which the structural units A are linked in the 4,4'-position.

14. An alloy as claimed in claim 9, in which at least one unit B2 or B3 occurs and is linked in the 4,4'-position.

15. An alloy as claimed in claim 9, in which at least one unit B1 or B8 occurs and is linked in the 1,4-position.

16. An alloy as claimed in claim 9, in which at least one unit B3 with D9 or D10 linked in the 1,4-position occurs.

17. A shaped article or a matrix material for composites which comprises an alloy as claimed in claim 1.

18. An injection molded product or extrusion product in the form of fibers, films or tubes, which comprises an alloy as claimed in claim 1.

* * * * *